Figure 3:
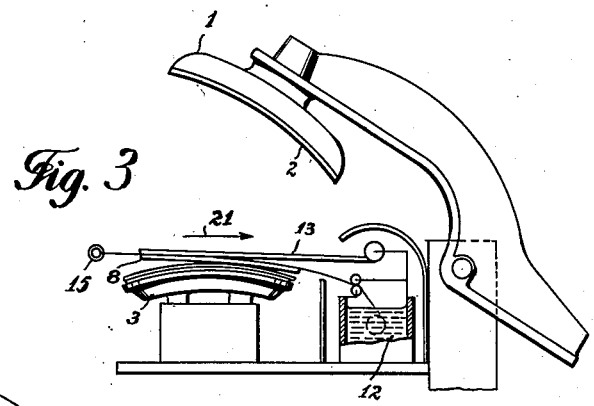

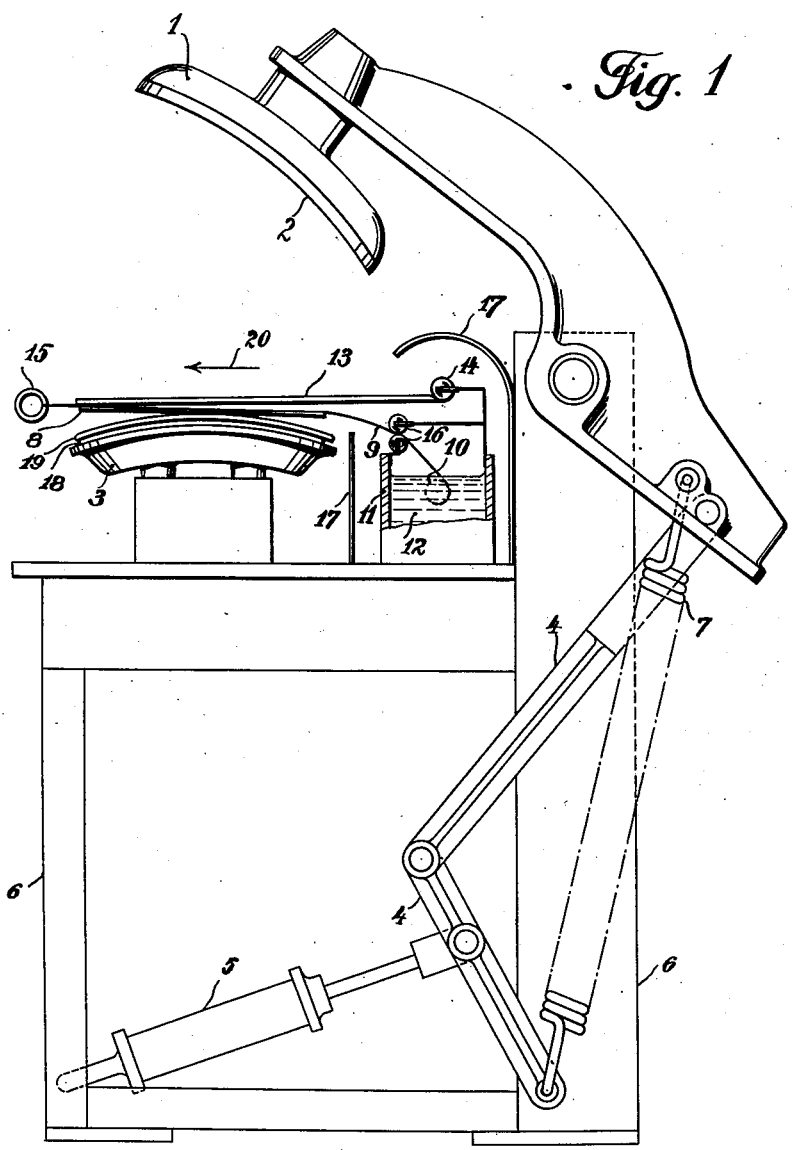

Feb. 4, 1941.  T. LOEW  2,230,621
APPARATUS FOR LAMINATING TEXTILES
Filed Dec. 14, 1939   2 Sheets-Sheet 2

INVENTOR.
Theodore Loew
BY
AGENT.

Patented Feb. 4, 1941

2,230,621

UNITED STATES PATENT OFFICE 2,230,621

APPARATUS FOR LAMINATING TEXTILES

Theodore Loew, Brooklyn, N. Y., assignor to Trubenizing Process Corporation, New York, N. Y., a corporation of New York Application December 14, 1939, Serial No. 309,216

13 Claims. (Cl. 154—1)

This invention relates to an apparatus for and a process of laminating textiles which are to be fused by means of an adhesive material such as cellulose acetate.

In the art of laminating textile materials for articles of wearing apparel, the best method currently used consists in first assembling with a ply of fabric containing latently adhesive yarns one or more other plies of fabric which are to be fused thereto, then subjecting the assembled plies to the simultaneous action of solvent and pressure without heat, and finally subjecting the semi-fused assembly to the action of pressure and heat which evaporates the solvent and "fixes" the fusing. This practice, as currently used, involves the use of two machines, a socalled wet press and a hot press, and involves the transfer of the semi-fused work from one machine to the other. So long as the parts to be laminated are small, e. g. collars and cuffs of men's shirts, the difficulty involved in this transfer is not serious. But when it is sought to apply the method to large objects, like a coat front, this transfer involves serious practical difficulties.

In order to eliminate these difficulties it is the main object of the present invention to provide an apparatus for and a process of laminating textiles without this double handling of the fabric plies that are to be united, thus providing a method especially adapted for handling large objects such as coat fronts or the like.

A further object of this invention is to provide a method of uniting fabrics in which the assembling of the component fabric plies can be carried out by the operator of the apparatus as a part of the fusing process without necessitating prior stitching or other assembling operations.

Still a further object of the present invention is to eliminate the loss of solvent into the atmosphere of the workroom which occurs when large dampened articles must be transferred from one machine to another.

In order to achieve these objects it is hereby proposed to provide a new apparatus for laminating textiles comprising a pair of relatively movable pressing members, an impervious heat insulating sheet, and a padding adapted to be saturated with liquids, both said sheet and said padding being adapted to be moved into pressing relationship between said pressing members and to be removed therefrom. When laminating textiles with this apparatus the operator first places the plies, at least one of which contains latently adhesive yarn, on the lower unheated pressing member of the apparatus. Thereafter a padding wetted with a solvent for the adhesive yarn is placed on said fabric plies, an impervious heat insulating sheet is placed thereon and the pressing members closed. The solvent softens the adhesive yarn and the insulating blanket prevents the heat of the upper pressing member of the apparatus from evaporating the solvent; thereafter the operator opens the press, removes the padding and the insulating sheet and closes the press again, thereby applying pressure and heat, evaporating the solvent and fixing the fusing, thus permanently uniting the fabrics. In this way the whole fusing process may be carried out on one apparatus of the type proposed without the necessity of transferring and handling the fabric plies during the process.

The invention includes also other novel features in the arrangement of the apparatus as will more fully appear in the accompanying drawings in which Fig. 1 shows an end elevation of an apparatus embodying the invention, the pressing members in open position, Figs. 2–5 show the same pressing apparatus during various stages of the fusing process.

As shown in Fig. 1 a pressing machine of conventional type e. g. an ordinary clothing or laundry press may be used for the proposed process. Machines of this type comprise a hollow steam heated buck 1 which may be covered with a resilient padding 2. This heated buck 1 cooperates with the oppositely positioned unheated lower buck 3. Buck 1 can be lowered by a toggle 4 operated by the separate air cylinder 5 in the base of frame 6. When the pressing buck 1 is released again the balancing springs 7 return it to open position.

The lower buck 3 may be positioned stationary or may also be movable in order to increase the pressure under which the textile materials placed between said bucks are treated. Apparatus of the type above described are well known for pressing laundry or clothing.

It is hereby proposed to use as a laminating attachment to pressing machines of this type a padding adapted to be saturated with liquid, an impervious heat insulating sheet, both said sheet and said padding being adapted to be placed in pressing relationship between said pressing bucks 1, 3 and to be removed therefrom. As shown in the drawings the removable absorbent padding 8 is fastened to the non-adsorbent material 9 which is in turn fastened to the spring operated roller 16, said roller 16 mounted within the container 11 containing the liquid solvent 12. When moved between the bucks this absorbent padding is next the unheated buck 3. The removable impervious insulating sheet 13 is provided between padding 8 and the heated buck 1 and cooperates with the latter. The spring operated roller 14 is adapted to roll up the insulating sheet 13. The handle 15 is attached to the front edge of the insulating sheet 13 and padding 8, joining them to each other, thereby enabling the operator to place them simultaneously between the bucks and to remove them simultaneously therefrom. The apparatus furthermore comprises the rollers 16 adapted to control the amount of solvent liquid carried out of the container 11 by the padding 8. The radiation shields 17 are provided for protecting the liquid container 11 and the rollers 16, 14, 16 from receiving radiant heat directly from the heated buck 1.

In order to show clearly the operation of the apparatus this is shown in Figures 1-5 during various stages of the laminating process.

The fabric plies 18 and 19 to be fused e. g. the fabric plies of a coat front are placed on the lower unheated buck 3. If the article is not assembled before the fusing operation the fabric plies 18, 19 are assembled by the operator in their proper sequence on the buck. In the arrangement shown for uniting a two ply coat front it is preferable to place the lining material 18 containing the cellulose derivative yarn first on the buck and to place over this lining material the outer ply of fabric 19. The operator then pulls the padding 8 and the insulating sheet 13 forward in direction of arrow 20, unrolling them into working position between the two bucks, as shown in Fig. 1. The absorbent padding 8 having preferably substantially the shape of the textile portions to be united and carrying the solvent, covers the fabric plies to be laminated. The padding 8 on its part is covered by the impervious insulating sheet 13.

Figure 2:
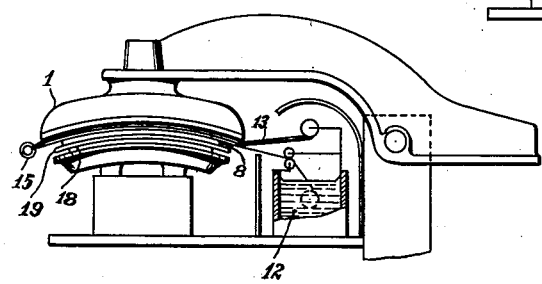

The fabric plies having been assembled on the lower buck, and covered with the solvent carrying padding, and the heat insulating sheet covering said padding, the apparatus is ready for work, and the pressing members are closed, as shown in Fig. 2. The pressure of the apparatus forces the solvent liquid from the absorbent padding into the fabric plies, peptizes or gelatinizes the cellulose derivative yarn and forces the softened cellulose derivatives into the adjacent textile plies of the assembled fabrics. The insulating sheet 13 prevents the heat of the upper buck 1 from evaporating the solvent. After a suitable period of time, for instance about 10 to 30 seconds, the bucks are opened again, as shown in Fig. 3; the padding 8 and the insulating sheet 13 are rolled up with the aid of springs or other suitable mechanisms in direction of arrow 21 unto the rollers 16 and 14, thereby removing them from the space between the pressing bucks.

Figure 4:
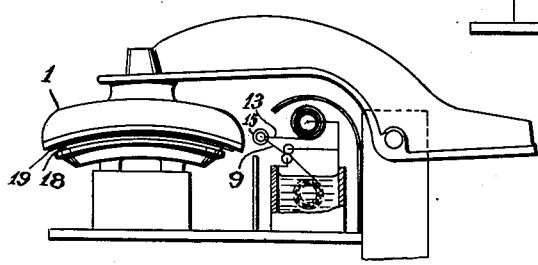

The next step in the process is to close the bucks again as shown in Fig. 4, this time the heated and preferably padded upper buck 1, coming in direct contact with the fabric plies wetted with the solvent and containing cellulose derivatives in adhesive state, evaporates the solvent, thereby hardening the cellulose derivatives and permanently uniting the fabric.

Figure 5:
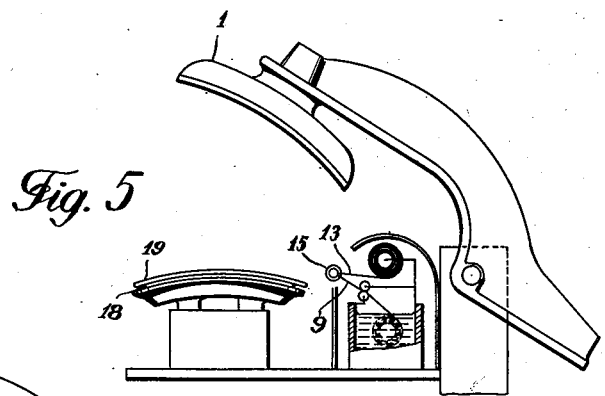

After evaporation of the solvent the pressing bucks are opened again as shown in Fig. 5 and the fabric plies 18 and 19 removed from the apparatus in fused condition. The apparatus is now ready for the next fusing cycle.

The amount of liquid with which the fabric plies are to be treated and consequently to a certain extent the degree of fusion and the stiffness of the assembly can be controlled in various ways; for example, the pressure of the controlling rolls 16 may be regulated and thereby the amount of the liquid solvent absorbed by the padding controlled. Furthermore it is also possible to vary the absorbency of the padding 8 carrying the solvent. This may be effected by the choice of material, as for instance, a heavy felt padding will carry more liquid than a muslin pad; by varying the thickness of the absorbent material the amount of solvent can also be controlled. In order to further avoid variations in the amount of solvent the level of liquid 12 in the container 11 may be controlled by controlling means e. g. a constant level valve or the like.

Furthermore it is often of advantage to keep the amount of solvent used at a minimum by restricting the area of the absorbent pad to the fabric parts to be united. For instance, the absorbent material having the shape of the area to be united may be attached to a non-absorbent flexible sheet, such as a woven wire screen or the like, and rolled up together with this sheet on the supporting roller. It is preferable to use an absorbent padding of this type where it is desired to unite only a portion of fabrics containing cellulose derivative yarn over their whole surface; in this case the absorbent padding is placed so as to cover only those portions which are to be united. The portions of the fabric plies not covered by the absorbent padding will not be dampened and consequently will not be fused together.

The location of the liquid container 11 filled with a volatile solvent near to the heated buck will cause considerable evaporation of the solvent, unless means are provided for preventing the liquid container from becoming heated. This may be obtained by providing the shields 17 as explained above; it is, however, also possible to cool the container itself e. g. by enclosing it in a cooling jacket, through which cooling fluid can be circulated.

In the course of operation, the insulating padding will gradually become heated, and finally will reach a substantially constant temperature somewhat higher than room temperature. If it is desired to lower this static temperature, the insulating padding can be cooled by a blast of air passing over the padding as it is rolled and unrolled; or the padding roller can be placed within a cooling jacket, through which cooling fluids are passed; or the padding may be rolled on a hollow roll through which the cooling fluid is circulated.

Moreover it is desirable to hold the lower unheated buck 3 at an average temperature sufficiently low to avoid substantial evaporation of the solvent during its application to the fabric plies. Therefor in certain cases it may be of advantage to provide this lower unheated buck with cooling means, e. g. a cooling circulation system within the buck or other means e. g. an air blast adapted to cool its working surface. It will be observed, however, that the tendency of the lower unheated buck to increase in temperature will be offset by a partial evaporation of the solvent when it is applied. Such slight evaporation of the solvent is not objectionable.

The cooling effect of this evaporation may be enhanced by so making the unheated buck that it has a low heat capacity. When the unheated buck is thus designed, the heat which it takes up during the hot pressing stage is readily dissipated either by a slight evaporation of the solvent on its subsequent application, or by an air blast or any other convenient means. In order to obtain an unheated buck of low effective heat capacity, a preferred embodiment consists of a base of suitable shape covered by a heavy layer of heat insulating material such as asbestos on top of which is placed a thin sheet of metal which constitutes the surface of the buck. Such a buck would have the desired low heat capacity.

It is also possible to fasten the absorbent padding adapted to be saturated with liquid solvent directly to the impervious heat insulating cover sheet on its surface facing the unheated buck. In this way the padding and the insulating sheet may be combined in one unit.

Although the terms used in the present descriptions are well known to the experts in this technical field, it should be added that by "cold pressing" is meant pressing at a temperature which is sufficiently low to retain in the materials during the pressing operation sufficient solvent to peptize the cellulose derivatives. This temperature may actually be considerably above room temperature. By "hot pressing" is meant pressing at a temperature sufficiently high to evaporate sufficient solvent to return the adhesive to the solid state in a reasonable length of time—from 10 to 40 seconds or more. A temperature of 250 degrees F. is usually sufficient.

It may be pointed out that the laminating process may be carried out on conventional laundry-clothing presses equipped with an attachment of the type described. In cases, however, where factory production on a large scale is required, it is of advantage to provide special laminating apparatus combining the technical features of the conventional laundry press and the laminating attachment, thereby adapting it to the special requirements of factory production.

What I claim is:

1. In an apparatus for laminating textiles, an unheated pressing member and a cooperating heated pressing member, an impervious heat insulating sheet, a liquid absorbent padding, and means enabling both said sheet and said padding to be moved between said pressing members in pressing relationship with the padding next the unheated member, and to be removed therefrom in order to enable consecutive cold wet and hot dry pressing in the same apparatus.

2. In an apparatus of the character described, an unheated pressing buck and a cooperating heated padded pressing buck, an insulating cover, a liquid absorbent padding, and means enabling both said cover and said padding to be moved simultaneously between said bucks in pressing relationship with the padding next the unheated buck, and adapted to be removed simultaneously therefrom in order to enable consecutive cold wet pressing and hot dry pressing in the same apparatus.

3. In an apparatus for laminating textiles, an unheated pressing buck and a cooperating heated padded pressing buck, an impervious heat insulating cover, a liquid absorbent padding fastened to a non-absorbent sheet material, said padding being adapted to be saturated with liquid and having the shape of the textile parts to be adhesively fused to each other, and means enabling both said cover and said padding to be moved simultaneously between said pressing members in pressing relationship and to be removed therefrom in order to enable consecutive cold wet pressing and hot dry pressing in the same apparatus.

4. In an apparatus for laminating textiles a pair of relatively movable pressing members, a removable impervious heat insulating sheet, a removable padding adapted to be saturated with liquid, both said sheet and said padding being adapted to be placed between said pressing members in pressing relationship, spring like means adapted to remove said sheet and said padding from the space between said pressing members in order to enable consecutive cold wet pressing and hot dry pressing in the same apparatus, and means for wetting said padding with a liquid solvent, said wetting means being positioned and cooperating with said padding in such a manner that the padding is automatically wetted by removing it from the space between said pressing members.

5. In an apparatus for laminating textiles, an unheated pressing buck, a heated preferably padded pressing buck, an impervious heat insulating cover, padding like means adapted to be saturated with liquids, both said cover and said padding like means being adapted to be placed between said bucks in pressing relationship, spring operated rollers being adapted to roll up said cover and said padding and to remove them thereby from the space between said bucks, and means for wetting said padding with a liquid solvent when removed.

6. In an apparatus for laminating textiles, a pair of relatively movable pressing members, an impervious heat insulating sheet, a padding adapted to be saturated with liquid, both said sheet and said padding being adapted to be placed between said pressing members in pressing relationship and to be removed therefrom, means for wetting said padding with a liquid solvent when said padding is removed, and controlling means for regulating the amount of the liquid solvent in the padding before it is placed between said pressing members.

7. In an apparatus for laminating textiles, an unheated pressing buck, a heated pressing buck, a removable impervious heat insulating sheet, a removable padding adapted to be saturated with a liquid solvent, a liquid container adapted to contain said solvent, and means for cooling said liquid container, said padding and said unheated buck.

8. In an apparatus for laminating textiles, a pair of relatively movable pressing members, a removable impervious heat insulating sheet, a removable padding adapted to be saturated with a liquid solvent, a liquid container adapted to contain said solvent, means for cooling said liquid container, and radiation shields adapted to protect said container and said cooling means from receiving radiant heat directly from said pressing members.

9. In an apparatus for laminating textiles, an unheated pressing buck, a heated preferably padded pressing buck, a removable impervious heat insulating cover between said bucks, and a liquid absorbent padding secured to said insulating sheet on its surface facing the unheated buck.

10. In a clothing press of the conventional type including a pair of relatively movable pressing members and power means for actuating them, an attachment comprising an impervious heat insulating sheet, a padding adapted to be saturated with a liquid solvent, a liquid container for said solvent, means for cooling said liquid container, and spring operated means adapted to move said sheet and said padding between said pressing members in pressing relationship and to remove them therefrom.

11. In a laundry press of the conventional type including a pair of pressing members, an attachment comprising an impervious heat insulating sheet, a padding adapted to be saturated with a liquid solvent, both said sheet and said padding being adapted to be placed between said pressing members in pressing relationship, a liquid container adapted to contain said solvent, cooling means for cooling said container, radiation shields protecting said container and said cooling means, and spring operated rollers adapted to roll up said insulating sheet and said padding in order to remove them from the space between the pressing members, the roller supporting the padding mounted within said liquid container in order to wet said padding simultaneously with its removal.

12. In an apparatus for laminating textiles, an unheated pressing buck of low effective heat capacity, a heated pressing buck, an impervious heat insulating sheet, a liquid absorbent padding, and means enabling both said sheet and said padding to be moved between said pressing bucks in pressing relationship and to be removed therefrom in order to enable consecutive cold wet pressing and hot dry pressing in the same apparatus.

13. In an apparatus for laminating textiles, a heated pressing buck, an unheated pressing buck consisting of a base of suitable shape covered by a heavy layer of heat insulating material and a thin sheet of metal on said layer constituting the surface of said unheated buck, an impervious heat insulating sheet, a liquid absorbent padding, and means enabling both said sheet and said padding to be moved between said pressing bucks in pressing relationship and to be removed therefrom in order to enable consecutive cold wet pressing and hot dry pressing in the same apparatus.

THEODORE LOEW.